US010398984B1

(12) United States Patent
Kim et al.

(10) Patent No.: US 10,398,984 B1
(45) Date of Patent: Sep. 3, 2019

(54) PROVIDING VIRTUAL CONTAINERS ACROSS ONLINE GAMES

(71) Applicant: Electronic Arts Inc., Redwood City, CA (US)

(72) Inventors: John Kim, San Francisco, CA (US); Kevin Chanthasiriphan, San Francisco, CA (US); Kevin Lee, Fremont, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 11 days.

(21) Appl. No.: 15/786,305

(22) Filed: Oct. 17, 2017

Related U.S. Application Data

(63) Continuation of application No. 14/205,236, filed on Mar. 11, 2014, now Pat. No. 9,795,885.

(51) Int. Cl.
*A63F 13/40* (2014.01)
*A63F 13/792* (2014.01)
*A63F 13/35* (2014.01)

(52) U.S. Cl.
CPC ............ *A63F 13/792* (2014.09); *A63F 13/35* (2014.09)

(58) Field of Classification Search
CPC .......... A63F 13/10; A63F 13/69; A63F 13/88; G07F 17/323; G07F 17/3267
See application file for complete search history.

(56) References Cited

U.S. PATENT DOCUMENTS 5,816,918 A 10/1998 Kelly
5,933,813 A 8/1999 Teicher
(Continued)

FOREIGN PATENT DOCUMENTS

KR 1020130137431 12/2013
WO 2002026333 1/2002
(Continued)

OTHER PUBLICATIONS

'Quest item—WoWWiki—Your guide to the World of Warcraft', printed from http://www.wowwiki.com/Quest_Item, Retrieved on Apr. 16, 2014, 1 page.
"A Wondrous Drop Event and Double EXP", [dated Aug. 22, 2012]. From flyff-wiki. [online], [retrieved on Jan. 12, 2016]. Retrieved from the Internet <URL:http://flyff-wiki.webzen.com/wiki/A_Wondrous_Drop_Event_and_Double_EXP>. 2 pages.
(Continued)

*Primary Examiner* — James S. McClellan
*Assistant Examiner* — Kevin M Carter
(74) *Attorney, Agent, or Firm* — Knobbe, Martens, Olson & Bear, LLP

(57) ABSTRACT

System and method for providing cross-game virtual containers in online games are disclosed. Virtual items usable in multiple online games may be packaged in a cross-game virtual container. Instances of cross-game virtual container may be presented for purchase by user in a virtual store. The price of a given instance of cross-game virtual container may be set as a fraction of the total of the individual prices of the virtual items in the given instance of cross-game virtual container. After an activation of a purchased instance of cross-game virtual container by a user in one of the online games, virtual items in the purchased instance of cross-game virtual container may be made available for access to the user in respective online games. In some examples, a notification may be generated for informing the user of the availability of the virtual items in the activated instance of cross-game virtual container.

16 Claims, 4 Drawing Sheets

(56) References Cited

U.S. PATENT DOCUMENTS

| | | | |
|---|---|---|---|
| 5,964,660 A | 10/1999 | James |
| 6,142,472 A | 11/2000 | Kliebisch |
| 6,190,225 B1 | 2/2001 | Coleman |
| 6,190,255 B1 | 2/2001 | Thomas |
| 6,306,033 B1 | 10/2001 | Niwa |
| 6,347,996 B1 | 2/2002 | Gilmore |
| 6,402,619 B1 | 6/2002 | Sato |
| 6,561,904 B2 | 5/2003 | Locke |
| 6,604,008 B2 | 8/2003 | Chudley |
| 6,607,437 B2 | 8/2003 | Casey |
| 6,745,236 B1 | 6/2004 | Hawkins |
| 6,811,483 B1 | 11/2004 | Webb |
| 6,811,484 B2 | 11/2004 | Katz |
| 6,850,900 B1 | 2/2005 | Hare |
| 6,928,474 B2 | 8/2005 | Venkatesan |
| 7,050,868 B1 | 5/2006 | Graepel |
| 7,076,453 B2 | 7/2006 | Jammes |
| 7,136,617 B2 | 11/2006 | Libby |
| 7,156,733 B2 | 1/2007 | Chiang |
| 7,192,352 B2 | 3/2007 | Walker |
| 7,197,352 B2 | 3/2007 | Gott |
| 7,326,115 B2 | 2/2008 | Baerlocher |
| 7,381,133 B2 | 6/2008 | Thomas |
| 7,455,586 B2 | 11/2008 | Nguyen |
| 7,533,336 B2 | 5/2009 | Jaffe |
| 7,660,740 B2 | 2/2010 | Boone |
| 7,682,239 B2 | 3/2010 | Friedman |
| 7,698,229 B2 | 4/2010 | Hsu |
| 7,749,056 B2 | 7/2010 | Ando |
| 7,785,188 B2 | 8/2010 | Cannon |
| 7,813,821 B1 | 10/2010 | Howell |
| 7,819,749 B1 | 10/2010 | Fish |
| 7,945,802 B2 | 5/2011 | Hamilton, II |
| 7,959,507 B2 | 6/2011 | Cannon |
| 8,010,404 B1 | 8/2011 | Wu |
| 8,016,668 B2 | 9/2011 | Hardy |
| 8,047,909 B2 | 11/2011 | Walker |
| 8,057,294 B2 | 11/2011 | Pacey |
| 8,066,571 B2 | 11/2011 | Koster |
| 8,105,156 B2 | 1/2012 | Walker |
| 8,147,340 B2 | 4/2012 | BrunetdeCourssou |
| 8,157,635 B2 | 4/2012 | Hardy |
| 8,187,101 B2 | 5/2012 | Herrmann |
| 8,226,472 B2 | 7/2012 | Van Luchene |
| 8,231,453 B2 | 7/2012 | Wolf |
| 8,231,470 B2 | 7/2012 | Feeney |
| 8,239,487 B1 | 8/2012 | Hoffman |
| 8,246,439 B2 | 8/2012 | Kelly |
| 8,272,934 B2 | 9/2012 | Olive |
| 8,272,951 B2 | 9/2012 | Ganz |
| 8,272,956 B2 | 9/2012 | Kelly |
| 8,282,491 B2 | 10/2012 | Auterio |
| 8,287,367 B2 | 10/2012 | Hall |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker |
| 8,317,584 B2 | 11/2012 | Aoki |
| 8,317,601 B1 | 11/2012 | Luciano, Jr. |
| 8,323,110 B2 | 12/2012 | Shibamiya |
| 8,328,642 B2 | 12/2012 | Mosites |
| 8,332,260 B1 | 12/2012 | Mysen |
| 8,332,544 B1 | 12/2012 | Ralls |
| 8,348,716 B2 | 1/2013 | Ganz |
| 8,348,762 B2 | 1/2013 | Willis |
| 8,348,767 B2 | 1/2013 | Mahajan |
| 8,348,768 B2 | 1/2013 | Auterio |
| 8,360,858 B2 | 1/2013 | LaRocca |
| 8,360,866 B2 | 1/2013 | VanLuchene |
| 8,360,867 B2 | 1/2013 | VanLuchene |
| 8,360,868 B2 | 1/2013 | Shvili |
| 8,366,544 B2 | 2/2013 | Walker |
| 8,366,550 B2 | 2/2013 | Herrmann |
| 8,371,925 B2 | 2/2013 | Bonney |
| 8,376,826 B2 | 2/2013 | Katz |
| 8,382,572 B2 | 2/2013 | Hoffman |
| 8,388,427 B2 | 3/2013 | Yariv |
| 8,401,913 B2 | 3/2013 | Alivandi |
| 8,408,989 B2 | 4/2013 | Bennett |
| 8,409,015 B2 | 4/2013 | Vanluchene |
| 8,439,759 B1 | 5/2013 | Mello |
| 8,475,262 B2 | 7/2013 | Wolf |
| 8,506,394 B2 | 8/2013 | Kelly |
| 8,512,150 B2 | 8/2013 | Herrmann |
| 8,533,076 B2 | 9/2013 | Chu |
| 8,583,266 B2 | 11/2013 | Herbrich |
| 8,636,591 B1 | 1/2014 | Hawk |
| 8,758,119 B1 | 6/2014 | BronsteinBendayan |
| 8,777,754 B1 | 7/2014 | Santini |
| 8,784,214 B2 | 7/2014 | Parks |
| 8,790,185 B1 | 7/2014 | Caldarone |
| 8,821,260 B1 | 9/2014 | DeSanti |
| 8,831,758 B1 | 9/2014 | Chu |
| 8,843,557 B2 | 9/2014 | Ranade |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis |
| 9,007,189 B1 | 4/2015 | Curtis |
| 9,138,639 B1 | 9/2015 | Ernst |
| 9,256,887 B2 | 2/2016 | Santini |
| 9,257,007 B2 | 2/2016 | Santini |
| 9,259,642 B1 | 2/2016 | McNeill |
| 9,286,510 B2 | 3/2016 | Soohoo |
| 9,317,993 B2 | 4/2016 | Hardy |
| 9,375,636 B1 | 6/2016 | Wakeford |
| 9,403,093 B2 | 8/2016 | Harrington |
| 9,406,201 B2 | 8/2016 | Englman |
| 9,452,356 B1 | 9/2016 | Tsao |
| 9,452,364 B1 | 9/2016 | Curtis |
| 9,463,376 B1 | 10/2016 | Kim |
| 9,468,851 B1 | 10/2016 | Pieron |
| 9,610,503 B2 | 4/2017 | Pieron |
| 9,626,475 B1 | 4/2017 | Schultz |
| 9,656,174 B1 | 5/2017 | McLellan |
| 9,669,313 B2 | 6/2017 | Pieron |
| 9,682,314 B2 | 6/2017 | Kim |
| 9,789,407 B1 | 10/2017 | Pieron et al. |
| 9,814,981 B2 | 11/2017 | McLellan et al. |
| 9,873,040 B1 | 1/2018 | Kim et al. |
| 10,195,532 B1 | 2/2019 | McLellan et al. |
| 10,226,691 B1 | 3/2019 | DeLaet et al. |
| 10,245,510 B2 | 4/2019 | Kim et al. |
| 10,252,150 B1 | 4/2019 | Kim et al. |
| 2002/0023039 A1 | 2/2002 | Fritsch |
| 2002/0059397 A1 | 5/2002 | Feola |
| 2002/0072412 A1 | 6/2002 | Young |
| 2002/0094863 A1 | 7/2002 | Klayh |
| 2002/0095327 A1 | 7/2002 | Zumel |
| 2002/0115488 A1 | 8/2002 | Berry |
| 2002/0119824 A1 | 8/2002 | Allen |
| 2002/0165794 A1 | 11/2002 | Ishihara |
| 2002/0183105 A1 | 12/2002 | Cannon |
| 2002/0193162 A1 | 12/2002 | Walker |
| 2003/0008713 A1 | 1/2003 | Ushiro |
| 2003/0027619 A1 | 2/2003 | Nicastro |
| 2003/0032476 A1 | 2/2003 | Walker |
| 2003/0102625 A1 | 6/2003 | Katz |
| 2003/0109301 A1 | 6/2003 | Chudley |
| 2003/0157978 A1 | 8/2003 | Englman |
| 2003/0174178 A1 | 9/2003 | Hodges |
| 2003/0190960 A1 | 10/2003 | Jokipii |
| 2003/0216167 A1 | 11/2003 | Gauselmann |
| 2004/0002387 A1 | 1/2004 | Grady |
| 2004/0068451 A1 | 4/2004 | Lenk |
| 2004/0143852 A1 | 7/2004 | Meyers |
| 2004/0199471 A1 | 10/2004 | Hardjono |
| 2004/0215524 A1 | 10/2004 | Parkyn |
| 2004/0224745 A1 | 11/2004 | Bregenzer |
| 2004/0225387 A1 | 11/2004 | Smith |
| 2004/0267611 A1 | 12/2004 | Hoerenz |
| 2005/0096117 A1 | 5/2005 | Katz |
| 2005/0114223 A1 | 5/2005 | Schneider |
| 2005/0165686 A1 | 7/2005 | Zack |

(56) References Cited

U.S. PATENT DOCUMENTS

| | | |
|---|---|---|
| 2005/0192087 A1 | 9/2005 | Friedman |
| 2005/0209008 A1 | 9/2005 | Shimizu |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0058103 A1 | 3/2006 | Danieli |
| 2006/0063587 A1 | 3/2006 | Manzo |
| 2006/0100006 A1 | 5/2006 | Mitchell |
| 2006/0116196 A1 | 6/2006 | Vancura |
| 2006/0155597 A1 | 7/2006 | Gleason |
| 2006/0200370 A1 | 9/2006 | Ratliff |
| 2006/0217198 A1 | 9/2006 | Johnson |
| 2006/0287029 A1 | 12/2006 | Yoshinobu |
| 2006/0287102 A1 | 12/2006 | White |
| 2007/0021213 A1 | 1/2007 | Foe |
| 2007/0077988 A1 | 4/2007 | Friedman |
| 2007/0105615 A1 | 5/2007 | Lind |
| 2007/0111770 A1 | 5/2007 | Van Luchene |
| 2007/0129139 A1 | 6/2007 | Nguyen |
| 2007/0129147 A1 | 6/2007 | Gagner |
| 2007/0155485 A1 | 7/2007 | Cuddy |
| 2007/0191101 A1 | 8/2007 | Coliz |
| 2007/0191102 A1 | 8/2007 | Coliz |
| 2007/0213116 A1 | 9/2007 | Crawford |
| 2007/0233585 A1 | 10/2007 | Ben Simon |
| 2007/0281285 A1 | 12/2007 | Jayaweera |
| 2008/0004093 A1 | 1/2008 | Van Luchene |
| 2008/0032787 A1 | 2/2008 | Low |
| 2008/0058092 A1 | 3/2008 | Schwartz |
| 2008/0076527 A1 | 3/2008 | Low |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo |
| 2008/0194318 A1 | 8/2008 | Kralicky |
| 2008/0200260 A1 | 8/2008 | Deng |
| 2008/0207306 A1 | 8/2008 | Higbie |
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0268946 A1 | 10/2008 | Roemer |
| 2008/0275786 A1 | 11/2008 | Gluck |
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0082099 A1 | 3/2009 | Luciano |
| 2009/0124353 A1 | 5/2009 | Collette |
| 2009/0204907 A1 | 8/2009 | Finn |
| 2009/0208181 A1 | 8/2009 | Cottrell |
| 2009/0210301 A1 | 8/2009 | Porter |
| 2009/0210324 A1* | 8/2009 | Bhogal ............... G06Q 10/087 705/28 |
| 2009/0234710 A1 | 9/2009 | Belgaied Hassine |
| 2009/0280905 A1 | 11/2009 | Weisman |
| 2009/0315893 A1 | 12/2009 | Smith |
| 2010/0022307 A1 | 1/2010 | Steuer |
| 2010/0035689 A1 | 2/2010 | Altshuler |
| 2010/0041472 A1 | 2/2010 | Gagner |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney |
| 2010/0107214 A1 | 4/2010 | Ganz |
| 2010/0113162 A1 | 5/2010 | Vemuri |
| 2010/0174593 A1 | 7/2010 | Cao |
| 2010/0198653 A1 | 8/2010 | Bromenshenkel |
| 2010/0210356 A1 | 8/2010 | Losica |
| 2010/0227675 A1 | 9/2010 | Luxton |
| 2010/0227682 A1 | 9/2010 | Reville |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2010/0306015 A1 | 12/2010 | Kingston |
| 2011/0045898 A1 | 2/2011 | Anderson |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia |
| 2011/0212756 A1 | 9/2011 | Packard |
| 2011/0218033 A1 | 9/2011 | Englman |
| 2011/0227919 A1 | 9/2011 | Bongio |
| 2011/0250954 A1 | 10/2011 | Braund |
| 2011/0256936 A1 | 10/2011 | Walker |
| 2011/0263324 A1 | 10/2011 | Ganetakos |
| 2011/0275438 A9 | 11/2011 | Hardy |
| 2011/0281638 A1 | 11/2011 | Bansi |
| 2011/0281654 A1 | 11/2011 | Kelly |
| 2011/0282764 A1 | 11/2011 | Borst |
| 2011/0300923 A1 | 12/2011 | VanLuchene |
| 2011/0319152 A1 | 12/2011 | Ross |
| 2011/0319170 A1 | 12/2011 | Shimura |
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman |
| 2012/0040743 A1 | 2/2012 | Auterio |
| 2012/0040761 A1 | 2/2012 | Auterio |
| 2012/0042282 A1 | 2/2012 | Wong |
| 2012/0046111 A1 | 2/2012 | Walker |
| 2012/0047002 A1 | 2/2012 | Patel |
| 2012/0059730 A1 | 3/2012 | Jensen |
| 2012/0083909 A1 | 4/2012 | Carpenter |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0202589 A1 | 8/2012 | Kelly |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider |
| 2012/0265604 A1 | 10/2012 | Corner |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0302329 A1 | 11/2012 | Katz |
| 2012/0302335 A1 | 11/2012 | Gregory-Brown |
| 2012/0309504 A1 | 12/2012 | Isozaki |

(56) References Cited

U.S. PATENT DOCUMENTS

| | | |
|---|---|---|
| 2012/0311504 A1 | 12/2012 | van Os |
| 2012/0322545 A1 | 12/2012 | Arnone |
| 2012/0322561 A1 | 12/2012 | Kohlhoff |
| 2012/0329549 A1 | 12/2012 | Johnson |
| 2012/0330785 A1 | 12/2012 | Hamick |
| 2013/0005437 A1 | 1/2013 | Bethke |
| 2013/0005466 A1 | 1/2013 | Mahajan |
| 2013/0005473 A1 | 1/2013 | Bethke |
| 2013/0005480 A1 | 1/2013 | Bethke |
| 2013/0006735 A1 | 1/2013 | Koenigsberg |
| 2013/0006736 A1 | 1/2013 | Bethke |
| 2013/0012304 A1 | 1/2013 | Cartwright |
| 2013/0013094 A1 | 1/2013 | Parks |
| 2013/0013326 A1 | 1/2013 | Miller |
| 2013/0013459 A1 | 1/2013 | Kerr |
| 2013/0029745 A1 | 1/2013 | Kelly |
| 2013/0036064 A1 | 2/2013 | Osvald |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1 | 4/2013 | Allen |
| 2013/0123005 A1 | 5/2013 | Allen |
| 2013/0124361 A1 | 5/2013 | Bryson |
| 2013/0143670 A1 | 6/2013 | Junkin et al. |
| 2013/0151342 A1 | 6/2013 | Citron |
| 2013/0173393 A1 | 7/2013 | Calman |
| 2013/0178259 A1 | 7/2013 | Strause |
| 2013/0210511 A1 | 8/2013 | LaRocca |
| 2013/0217453 A1 | 8/2013 | Briggs |
| 2013/0217489 A1 | 8/2013 | Bronstein Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0260850 A1 | 10/2013 | Carpe |
| 2013/0288757 A1 | 10/2013 | Guthridge |
| 2013/0288787 A1 | 10/2013 | Yoshie |
| 2013/0290147 A1 | 10/2013 | Chandra |
| 2013/0303276 A1 | 11/2013 | Weston |
| 2013/0303726 A1 | 11/2013 | Mozzarelli |
| 2013/0310164 A1 | 11/2013 | Walker |
| 2013/0324259 A1 | 12/2013 | McCaffrey |
| 2013/0339111 A1 | 12/2013 | Ross |
| 2013/0339228 A1 | 12/2013 | Shuster |
| 2013/0344932 A1 | 12/2013 | Adams |
| 2014/0004884 A1 | 1/2014 | Chang |
| 2014/0011565 A1 | 1/2014 | Elias |
| 2014/0018156 A1 | 1/2014 | Rizzotti |
| 2014/0033262 A1 | 1/2014 | Anders |
| 2014/0038679 A1 | 2/2014 | Snow |
| 2014/0038721 A1 | 2/2014 | Archer |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1* | 4/2014 | Constable ............... A63F 13/10 463/25 |
| 2014/0128137 A1 | 5/2014 | Balise |
| 2014/0157314 A1 | 6/2014 | Roberts |
| 2014/0180725 A1 | 6/2014 | Ton-That |
| 2014/0206449 A1 | 7/2014 | Alman |
| 2014/0206452 A1 | 7/2014 | Bambino |
| 2014/0243065 A1 | 8/2014 | Wright |
| 2014/0243072 A1 | 8/2014 | Santini |
| 2014/0274359 A1 | 9/2014 | Helava |
| 2014/0295958 A1 | 10/2014 | Shono |
| 2014/0309026 A1 | 10/2014 | Inukai |
| 2014/0329585 A1 | 11/2014 | Santini |
| 2014/0337259 A1 | 11/2014 | Lamb |
| 2014/0379455 A1 | 12/2014 | Bous |
| 2015/0011305 A1 | 1/2015 | Deardorff |
| 2015/0019349 A1 | 1/2015 | Milley |
| 2015/0031440 A1 | 1/2015 | Desanti |
| 2015/0065241 A1 | 3/2015 | McCarthy |
| 2015/0065256 A1 | 3/2015 | Cudak |
| 2015/0273320 A1 | 10/2015 | Pieron |
| 2015/0306494 A1 | 10/2015 | Pieron |
| 2015/0335995 A1 | 11/2015 | McLellan |
| 2015/0352436 A1 | 12/2015 | Pieron |
| 2016/0121219 A1 | 5/2016 | Kim |
| 2016/0236094 A1 | 8/2016 | Pieron |
| 2016/0361654 A1 | 12/2016 | Pieron |
| 2017/0326456 A1 | 11/2017 | Kawaguchi et al. |

FOREIGN PATENT DOCUMENTS

| | | |
|---|---|---|
| WO | 2013013281 | 1/2013 |
| WO | 2013059639 | 1/2013 |
| WO | 2013116904 | 1/2013 |
| WO | 2015013373 | 1/2015 |
| WO | 2015153010 | 10/2015 |
| WO | 2015168187 | 11/2015 |
| WO | 2015179450 | 11/2015 |
| WO | 2015196105 | 12/2015 |

OTHER PUBLICATIONS

"Behavioural Analytics & Campaigning", http://lotaris.com/behavioural._analytics_and._Campaigning.htm, screenshot access date May 24, 2012 2:21 PM, 1 page.

"Building Structures". War2.warcraft.org. Online. Accessed via the Internet. Accessed Aug. 9, 2014. <URL: http://war2.warcraft.org/strategy/verybasics/building.shtml>, 3 pages.

"Clash of Clans". Wikipedia.org. Online. Accessed via the Internet. Accessed Aug. 9, 2014. <URL: http://en.wikipedia.org/wiki/Clash of Clans>, 3 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.

"Flyff", [dated May 25, 2013]. From Wikipedia, The Free Encylopedia. [on line], [retrieved on Jan. 12, 2016]. Retrieved from the Internet<URL:https://en.wikipedia.org/w/index.php?title=Flyff&oldid=556751091 >. 4 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Getting Started" written by BoD, published on Oct. 13, 2011 and printed from URL <http://lotrowiki.com/index.php?title=Getting_Started&oldid=349681 >, 5 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do->, Apr. 23, 2014, 9 pages.

"Lotro Store" written by Elinnea, published on Dec. 15, 2011 and printed from URL <http://lotrowiki.com/index.php?title=LOTRO_Store&oldid=396550>, 23 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_

(56) References Cited

OTHER PUBLICATIONS

Part_1&oldid=399597, http://lotro-wiki.com/index.php?title=Quest:A_Little_Extra_Never_Hurts_--_Part_2&oldid=399366, http://lotro-wiki.com/index.php?title=Getting_Started&oldid=349681, Links are to used articles, 33 pages.
"Lotro-Wiki.com" (evidence in regards to "Lord of the Rings Oline" MMORPG game), latest Dec. 22, 2011, <http://lotrowiki.com/index.php/Main_Page), http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--_Part_2&oldid=399366, http://lotro-wiki.com/index.php?title=Getting_Started&oldid=349681, Links are to used articles, 33 pages.
"Main Page" written by Starbusty, published on Dec. 12, 2011 and printed from URL <http://lotrowiki.com/index.php?title=Main_Page&oldid=394429>, 2 pages.
"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_--_Part_1&oldid=399597>, 3 pages.
"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_--_Part_2&oldid=399366>, 2 pages.
"Scroll of Amplification R", [dated Apr. 26, 2012]. From flyff-wiki. [online], [retrieved on Jan. 12, 2016]. Retrieved from the Internet<URL:http://flyff-wiki.webzen.com/wiki/Scroll_of_Amplification_R>. 3 pages.
"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.
<http://lotro-wiki.com/index.php?title=Ouest:A_Little_Extra_Never_Hurts_--_Part_2&oldid=399366>, <http://lotrowiki.com/index.php?title=Getting_Started&oldid=349681 >. Links are to used articles. (7 pgs) Feb. 26, 2014.
City Coins. CityVille Wikia. Online. Accessed via the Internet. Accessed Aug. 9, 2014. <URL: http://cityville.wikia.com/wiki/City_Coins>, 2 pages.
Elsword—Wikipedia, the free encyclopedia, URL: en.wikipedia.org/wiki/Elsword [Retrieved Feb. 21, 2013], 6 pages.
FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.
Gaia "Black Friday Bundle" available on Nov. 23, 2011, from http://www.gaiaonline.com/forum/community-announcements/black-friday-big-bundles-rare-items/t.76127933/, 5 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.
Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.
MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.
New Feature: Tiered Tournaments and Tournament Updates, printed from http://community.kabam.com/forums/showthread.php?171349-New-Feat on Feb. 11, 2014, 2 pages.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).

Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
PCT International Search Report and Written Opinion for PCT/US2016/017637 dated Apr. 7, 2016, 12 pages.
TFWiki "teamfortress wiki" available Nov. 5, 2011 retrieved from https://web.archive.org/web/20111105044256/http://wiki.teamfortress.com/wiki/Loadout, 4 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online'", available on Sep. 9, 2011, https://web.archive.org/web/20110927210155/http://en.wikipedia.org/wiki/Gaia_Online, 8 pages.
Wikipedia, Mafia Wars, <http://en.wikipedia.org/wiki/Mafia_Wars>, Jan. 28, 2012, 3 pages.
"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.
"Cataclysm Guide: Guild Advancement—Wowhead", http://www.wowhead.com/guide=cataclysm&guilds, printed Dec. 5, 2013, 4 pages.
"Guild Housing System—FlyFF Wiki", http://flyff-wiki.gpotato.com/wiki/Guild_Housing_System, printed Dec. 5, 2013, 5 pages.
"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.
"Rest—WoWWiki—Your guide to the World of Warcraft", printed from http://www.wowwiki.com/Rest, May 19, 2014, 2 pages.
Diablo 2, Blizzard Entertainment, Mar. 23, 2009, manual and online website, http://web.archive.Org/web/20090323171356/http://classic.battle.net/diablo 2exp/items/basics.shtml, 51 pages.
Dreamslayer's Enchanting and Upgrading Guide—With Pictures:D and Explanations, URL: forums.elswordonline.com/Topic5673.aspx [Retrieved Feb. 21, 2013], 8 pages.
Elsword, Dec. 27, 2007, KOG Studios, Guide posted Mar. 17, 2011, http://forums.elswordonline.com/topic5673.aspx,http://en.wikipedia.org/wiki/Elsword, 16 pages.
Gem System—Street Fighter X Tekken, http://www.streetfighter.com/us/sfxtk/features/gem-system, printed Nov. 6, 2012, 6 pages.
MapleStory, Internet guide: http://maplestory.nexon.net/guides/gameplay/systems/00Flk/, http://maplestory.nexon.net/guides/game-play/systems/00Flk, http://maplestory.nexon.net/guides/game-play/systems/00FFV, Sep. 28, 2012, 12 pages.
MapleStory—Guides—Equipment Upgrading 101: Enhancements, URL: maplestory.nexon.net/guides/game-play/systems/OOFlk; [Retrieved Jun. 24, 2013] 3 pages.
MapleStory—Guides—Equipment Upgrading 101: Potentials, URL: maplestory.nexon.net/guides/game-play/systems/OOFlj/ [Retrieved Jun. 24, 2013], 5 pages.
MapleStory—Guides—Equipment Upgrading 101: Scrolls, URL: maplestory.nexon.net/guides/game-play/systems/OOFFV/#mitigating [Retrieved Jun. 24, 2013], 4 pages.
Path of Exile, Internet posting: http://web.archive.org/web/20120606004658/http://www.pathofexile.com/forum/view-thread/12056, Nov. 16, 2011, 52 pages.
Profession—WoWWiki—Your guide to the World of Warcraft, URL: http://www.wowwiki.com/Profession, printed Nov. 6, 2012, 8 pages.
Super Mario Bros. 3, NES Gameplay, http://www.youtube.com/watch?v=82TL-Acm4ts, Published on Mar. 14, 2009, 1 page.
Super Mario Bros. 3, StrategyWiki, the video game walkthrough and strategy guide, http://strategywiki.org/wiki/Super_Mario_Bros._3, Oct. 2, 2012, 4 pages.
Super Mario Bros. 3 Review, Nintendo for NES, Feb. 1990, pp. 1-4.
TFF Challenge—UC Davis, http://tffchallenge.com/team/uc-davis/, printed Jan. 15, 2014, 12 pages.

(56) References Cited

OTHER PUBLICATIONS

The Arreat Summit—Items: Basic Item Information, URL: web.archive.org/web/20090323171356/http://classic.battle.net/diablo2exp/items/basics.shtml [Retrieved Feb. 21, 2013], 3 pages.

"Lotro-Wiki.com" (evidence in regards to "Lord of the Rings Oline" MMORPG game),latest Dec. 22, 2011,<htlp://lotrowi ki .com/i ndex.ph p/Main _Page )(hereinatter referred to as Lotro>,<http://lotrowiki.com/index.php?itle=LOTRO_Store&oldid=396550>,<http://lotrowiki.com/index.php?title=Ouest:A_Little_Extra_Never_Hurts_--_Part_1 &oldid=399597> (28 pgs).

* cited by examiner

PROVIDING VIRTUAL CONTAINERS ACROSS ONLINE GAMES

FIELD OF THE DISCLOSURE

This disclosure relates to providing virtual containers in an online game, the virtual container comprising virtual items usable in one or more other online games.

BACKGROUND

Providing virtual containers of virtual items usable in an online game is known. Typically conventional virtual containers are provided to users for purchase through stores associated with the online game. Upon activation of the purchased virtual containers, virtual items in the virtual containers are distributed to users for access in the online game. Examples of conventional virtual containers include chests, mystery boxes (or chests with one or more mystery items), treasure troves, item bundle, random box and/or any other virtual items.

SUMMARY

One aspect of the disclosure relates to providing cross-game virtual containers in online games. A given cross-game virtual container may include multiple virtual items usable in multiple online games. For example, without limitation, the given cross-game virtual container may include a first virtual item usable in a first online game and a second virtual item usable in a second online game. Instances of the given cross-game virtual container may be offered for purchase in one or more virtual stores of the multiple online games in exchange for consideration, e.g., virtual currencies, from users. A purchased instance of the given cross-game virtual container may be activated by user for distribution of the virtual items in the instance of the given cross-game virtual container. For example, upon activation of the purchased instance of the cross-game virtual container by a user in the first online game, the first virtual item in the instance of the given virtual item may be made available for access to the user in the first online game and the second virtual item may be made available for access to the user in the second online game. In some examples, a notification may be generated upon the activation of the cross-game virtual container to notify the user that a virtual item has been distributed to an online game with which the user is not currently interacting (e.g., a game the user has not yet established an account for, a game the user used to play but is no longer active in, etc.). For instance, in the example described above, a notification may be generated to notify the user that the second virtual item has been made available for access to the user in the second online game upon user activating the purchased instance of the given cross-game virtual container in the first online game. This may incentivize the user to engage in multiple online games and thus enhance monetization opportunities for the providers of the multiple online games.

In some examples, the price of an instance of the given cross-game virtual container presented in the virtual store may be set such that it may be perceived as a bargain to the users. For example, without limitation, the price of the instance of the given cross-game virtual container may be set and presented as a fraction of a total of the prices for virtual items included in the instance individually. In some examples, offers of virtual items included in the instance may be presented individually to the user in the virtual store so that users may compare the prices of cross-game virtual containers with the individual prices of the virtual items included in the cross-game virtual containers. In some examples, a time period may be determined for users such that the virtual items in the activated instance of the cross-game virtual container will be available for the users to access only during this time period after activation. In this way, the users may be incentivized to engage other online game(s) after they activate the purchased instances of cross-game virtual containers. This may cross-promote online games.

A system configured for providing instances of cross-game virtual containers that distribute virtual items usable in multiple online games may include one or more of a server hosting the multiple online games. A given server may operate in a client/server architecture with one or more client computing platforms. The client computing platforms may be associated with the users of the game space. The given server may be configured to execute one or more of a game component, a store component, a cross-game virtual container activation component, a notification component and/or other components.

The game component may be configured to execute an instance of a given online game such as a first online game. The instance of the given online game executed by the game component may be associated with a given game space in which gameplays may be facilitated for users of the given online game. Within the given game space, users may control one or more of an element in the given game space. The users may input commands with specific parameters to undertake specific deeds, maneuvers, actions, functions, spheres of actions and/or any other types of interactions within the given game space.

The store component may be configured to present offers to sell instances of cross-game virtual containers to users. The store component may present such offers through a store interface representing a virtual store in a given game space. A given instance of the cross-game virtual container offered in the store interface may comprise virtual items usable in multiple online games. For example, without limitation, the given instance of the cross-game virtual container may include a first virtual item usable in the first online game, a second virtual item usable the second online game and any other virtual items usable in other online games (if any). The virtual items included in an instance of the cross-game virtual container may include resources, armor, weapon, speedup items, gears, magic items, decorative items, troops and/or any other types of virtual items.

In some examples, presenting offers of instance of the cross-game virtual container in the store interface by the store component may include obtaining a price for an offer to sell an instance of a given virtual container. The prices obtained in those examples by the store component may be such that they are perceived as bargains to users. For example, the price obtained by the store component may be such that it is a fraction of a total of the prices for purchasing the virtual items in the given instance of the cross-game virtual container individually. In another example, a virtual item in the given instance of the cross-game virtual container may be offered free or nearly free. In some examples, offers of the individual virtual items in the cross-game virtual container may be presented in the store interface next to a given instances of the cross-game virtual container so that a user may be informed of the bargain price at which a given instance of the cross-game virtual container is being offered.

The cross-game virtual container activation component may be configured to activate instances of the cross-game virtual containers purchased by the users in store associated with a given online game. This may involve mapping user names in different online games, locating user accounts in those online games, distributing the virtual items to user inventories associated with the located user accounts in those online games and/or any other operations. In some examples, activation of a given instance of the cross-game virtual container by the cross-game virtual container activation component may include obtaining a period of time during which one or more virtual items are available for access by users. For example, a virtual item in the activated instance of the cross-game virtual container may be available for access by the user for one hour, one day, one week, one month or any other period of time after the instance of the cross-game virtual container is activated by the cross-game virtual container activation component. In some examples, activation of a given instance of the cross-game virtual container by the cross-game virtual container activation component may include some random factor for distributing virtual items associated with the given instance of the cross-game virtual container to the users.

The notification component may be configured to generate notifications for notifying users that virtual items in activated instances of the cross-game virtual containers by the user in a given game space have been made available for access by the users in one or more online games corresponding to the virtual items. The notifications generated by the notification component may notify users that virtual items in activated instances of the cross-game virtual containers by the user in a given game space have been made available for access by the users in one or more online games corresponding to the virtual items. In some examples, the notifications generated by the notification component may include information facilitating users to access the online games corresponding to virtual items in a given activated instance of the cross-game virtual container. In some examples, the notifications generated by the notification component 118 may include information indicating such a period of time.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
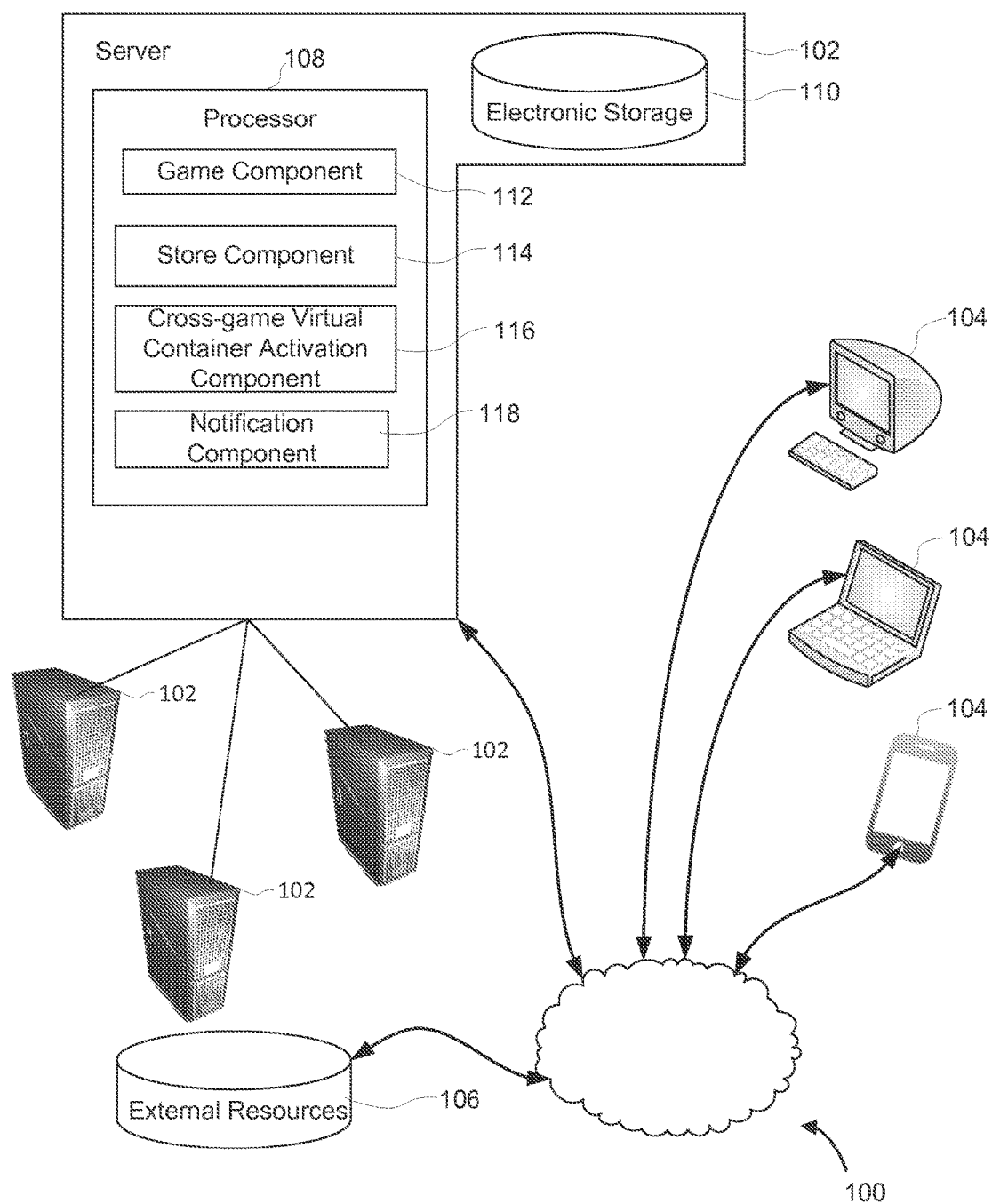
FIG. 1 illustrates a system for providing cross-game virtual containers in online games.

FIG. 1 illustrates a system 100 for providing cross-game virtual containers in online games. Providing the online games may include hosting the online games over a network. In some implementations, as shown in this example, system 100 may include servers 102 configured for hosting online games. As shown, a given server 102 may be configured to communicate with one or more client computing platforms 104 according to a client/server architecture, and with each other. The users may access system 100 and/or the virtual space via client computing platforms 104. As shown, the servers 102 may comprise processors 108 configured to execute computer readable instructions to implement system components. The computer program components may include one or more of a game component 112, a store component, a cross-game virtual container activation component 116, a notification component 118, and/or other components.

The game component 112 may be configured to execute an instance of a given online game. The given online game may include a first online game, a second online game, or any other online game. Within the instance of the first online game, users of the first online game may interact with elements in the first online game and/or with each other through gameplays provided by the first online game. The gameplays may include role-playing, first-person shooter, real-time strategy, turn-based strategy, simulation, music or rhythm playing, social interaction, twitching and/or any other gameplays. The execution of the instance of the first online game by game component 112 may include determining a state associated with the first online gam. The state may be communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in a first game space associated with the first online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the first online game may be persistent. That is, the first online game may continue on whether or not individual users are currently logged in and/or participating in the online game. A user that logs out of the first online game and then logs back in some time later may find the first game space associated with the first online game has been changed through the interactions of other users with the first game space during the time the user was logged out. These changes may include changes to the simulated physical space, changes in the user's inventory, changes in other users' inventories, changes experienced by non-user characters, and/or other changes.

The instance of the first online game may comprise a simulated game space, e.g., a first game space that is accessible by users via clients (e.g., client computing platforms 104) that present the views of the first game space to a user. The first game space may have a topography, express ongoing real-time interaction by one or more users and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the first online game may comprise virtual space entities automatically controlled in the instance of the first online game. Such virtual space entities may not be associated with any user. As such, the automatically controlled virtual space entities may be generated and/or developed by artificial intelligence configured with the server 102 by a provider, administrator, moderator, and/or any other entities related to the online game. These automatically controlled entities may evolve within the virtual space associated with the first online game free from user controls and may interact with the entities controlled by or associated with the users, other automatically controlled virtual space entities, as well as the topography of the first game space. Certain manifested traits may be associated with the automatically controlled entities in accordance with the artificial intelligence configured with the server 102. As used herein, such automatically controlled virtual space entities in the instance of the online game are referred to as "AI entities".

The above description of the manner in which state of the first game space associated with the first online game as determined by game component 112 is not intended to be limiting. The game component 112 may be configured to express the first game space in a more limited, or richer, manner. For example, views determined for the first game space representing the state of the instance of the first game space may be selected from a limited set of graphics depicting an event in a given place within the first game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance of the first online game executed by game component 112, the users may participate in the instance of the first online game by controlling one or more of an element in the first game space associated with the online game. The user-controlled elements may include avatars, game space characters, game space units (e.g., troops), objects (e.g., weapons, horses, vehicle and so on), simulated physical phenomena (e.g., wind, rain, earthquakes, and/or other phenomena), and/or other user-controlled elements. The user-controlled avatars may represent the users in the first game space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other virtual space entities that may be trained, recruited, captured, and/or otherwise acquired by the users in groups or en mass. The objects controlled by the users may include weapons, vehicles, projectiles, magic items, wardrobes, boots, armor, knapsacks, medicine, healing potion, and/or any other virtual items that may be employed by the users for interaction within the first online game.

In any case, the user-controlled elements may move through and interact with the first game space (e.g., AI entities, elements controlled by other users and/or topography in the virtual space) associated with the first online game. The elements controlled by a given user may be created and/or customized by the given user. The given user may have an "inventory" of virtual goods and/or currency usable within the first game space.

Controls of virtual elements in the first game space may be exercised through commands input by a given user through client computing platforms 104. The given user may interact with other users through communications exchanged within the first game space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through game component 112).

A given user may input commands with specific parameters to undertake specific deeds, actions, functions, spheres of actions and/or any other types of interactions within the first game space. For example, the given user may input commands to construct, upgrade and/or demolish virtual buildings; harvest and/or gather virtual resources; heal virtual user-controlled elements, AI entities and/or elements controlled by other users; train, march, transport, reinforce, reassign, recruit, and/or arrange troops; attack, manage, create, demolish and/or defend cities, realms, kingdoms, and/or any other virtual space locations controlled by or associated with the users; craft or transport virtual items; interact with, compete against or along with AI entities and/or virtual space elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual space. In some examples, the given user may input commands to compete against elements in an environment within the virtual space—i.e., Player vs. Environment (PvE) activities. In some examples, the given user may input commands to compete against each other within the virtual space—i.e., Player vs. Player (PvP) activities.

The game component 112 may be configured to execute user actions to facilitate interaction of the users with the first game space and/or each other in response to receiving virtual space commands input by the users. Execution of the user action by the game component 112 may produce changes to the game state, which may reflect progresses and/or results of the user actions. In some examples, state changes caused by the execution of the user actions may be recorded in the electronic storage 110 to facilitate persistency throughout the instance of the first online game. In some examples, execution of the user actions may not produce persistent changes to the game state (e.g., a user character jumping forward and backward successively may not produce any perceivable game state changes to other users).

It should be understood that individual servers 102 shown in FIG. 1 may comprise corresponding game components 112 configured with functionalities described above and attributed to game component 112. For example, an instance of a second online game may be executed by a game component in a server 102. A second game space may be associated with the second online game. The second game space may provide gameplays similar to or different from those provided by the first game space. In some examples, the second online game may be hosted by a server 102 (or servers) different from that (or those) hosting the first online game. In some other examples, first and second online games may be hosted by the same server 102.

In any case, the second game space associated with the second online game may be separate and discrete from the first game space associated with the first online game. Such a property of separation between the first and second online games may involve separate client-side applications for invoking respective online games, separate game space interfaces, separate game states, separate game characters, separate game rules, separate game mechanics, separate game objectives, separate users, and/or any other separate properties that distinguish the first game space associated with the first online game from the second game space associated with the second online game. By way of non-limiting example, the first online game may be an online game in which users play kingdom lords in the first game space that simulates a medieval world; and the second online game may be an online game in which users play future characters within the second game space that simulates a future world. In that example, the first online game may be separate and discrete from the second online game such that users of the first online game may not interact with the second game space from the first online game (e.g., through a game space interface of the first online game); and the users of the second online game may not interact with the first game space from the second online game. As described above, this may involve, but not be limited to, facilitating different game space interfaces for user interaction with the first online and second online games (e.g., a dedicated game space interface for the first online game and a dedicated game space interface for the second online game), maintaining separate state information corresponding to the first and second game spaces, maintaining separate user accounts associated with the first and second online games, providing different gameplays, characters, simulations, topography, and/or any other elements in first online game than in the second online game, and/or any other operations for operating the first and second online games separately and independently.

In some examples, the first and second online games may be developed and/or hosted by the same provider(s). In those examples, an interface may be implemented on a client computing platform 104 enabling a user to select in which online game to participate. For example, an icon representing the first online game and an icon representing the second online game may be presented in the interface side by side for the user to select in which online game to participate. In some other examples, the first and online game may be accessed through webpages over the Internet such that users may be logged into the first or second online games through the webpages. Other examples of accessing first and second online games are contemplated.

Within a given game space associated with a given online game executed by a server 102, inventories of virtual items may be associated with users of the given online game. A given user inventory may provide an accounting of virtual items, such as virtual currencies, resources, objects, units, and/or any other game space elements that have been procured, controlled by, and/or otherwise associated with a given user in that game space. Such accounting of virtual items may reflect balances of the virtual items with associated the given user, e.g., a quantity of these virtual items, in the user inventory. The virtual items in a given user inventory may include virtual items, instances of virtual containers, virtual currencies, resources, objects usable in the game space (e.g., weapons, equipment, garments, etc.), units (e.g., troops), and/or any other virtual items under the given user's control in the given game space. By way of a non-limiting example, the given user may have an X number of virtual currencies, a Y number of a virtual resource (e.g., iron, ore, wood, coal, etc.), and a Z number of troops in the inventory associated with the given user. In that example, the X, Y, and Z may reflect a level of balance of the virtual currencies, resources, and troops associated with the given user respectfully.

Balances of virtual items in the user inventory may increase, replenish, or exhaust in response to the user acquiring or consuming the virtual items through a virtual store operated by the provider of the game space, user actions in the game space (e.g., acquiring virtual objects, harvesting resources, consuming resources for crafting, etc.), game space activities participated in by the user, and/or other events associated with the user in which the user may acquire and/or consume virtual items. For example, construction actions initiated by users may consume specific resources in accordance with resource requirements associated with the construction actions, and the user inventory may exhaust the specific resource in the user inventory during execution of the construction. Conversely, users may acquire virtual containers, resources, virtual items, and/or other game space elements in the instance of the game space, and the balance of the virtual items in the user inventory may increase accordingly to reflect the user acquisition.

A user may access (e.g., use or consume) virtual items in the user inventory associated with the user within a given game space. In some examples, an inventory interface may be presented to the user on client computing platform 104 upon the user's request to access virtual items in the user inventory associated with the user in the given game space. Through the inventory interface, the user may assign a virtual item in the inventory to a body slot of the user character such that the user character "wears" the virtual item in the given game space. As another non-limiting example, through the user inventory interface, the user may consume a virtual item such as portion to restore health of the user character. Still in another example, through the inventory interface, the user may retrieve a virtual item (e.g., a key) in the user inventory to complete a task (e.g., unlock a door). However, it should be understood this is merely illustrative. Other ways of accessing virtual items of a user in the given space are contemplated. For example, a quick access interface may be presented to the user on the client computing platform 104 as a part of the game space interface such that the user may use virtual items appearing in the quick access interface. In another example, a user may access virtual items in the user inventory through keyed-in commands (e.g., ctrl 1, 2, 3, 4 and so on) for switching equipment carried by the user character (e.g., switching weapons).

The store component 114 may be configured to present offers to sell instances of cross-game virtual containers to users. The store component may present offers of virtual items and/or services through a store interface representing a virtual store in a given game space. Such a store interface may be implemented on client computing platforms. Through the store interface, a user may be enabled to purchase an instance of the cross-game virtual container. For instance, through a store interface implemented on a client computing platform, a user may click on an offer of an instance of a cross-game virtual container presented in the store interface to purchase the instance of the virtual container.

Figure 2:
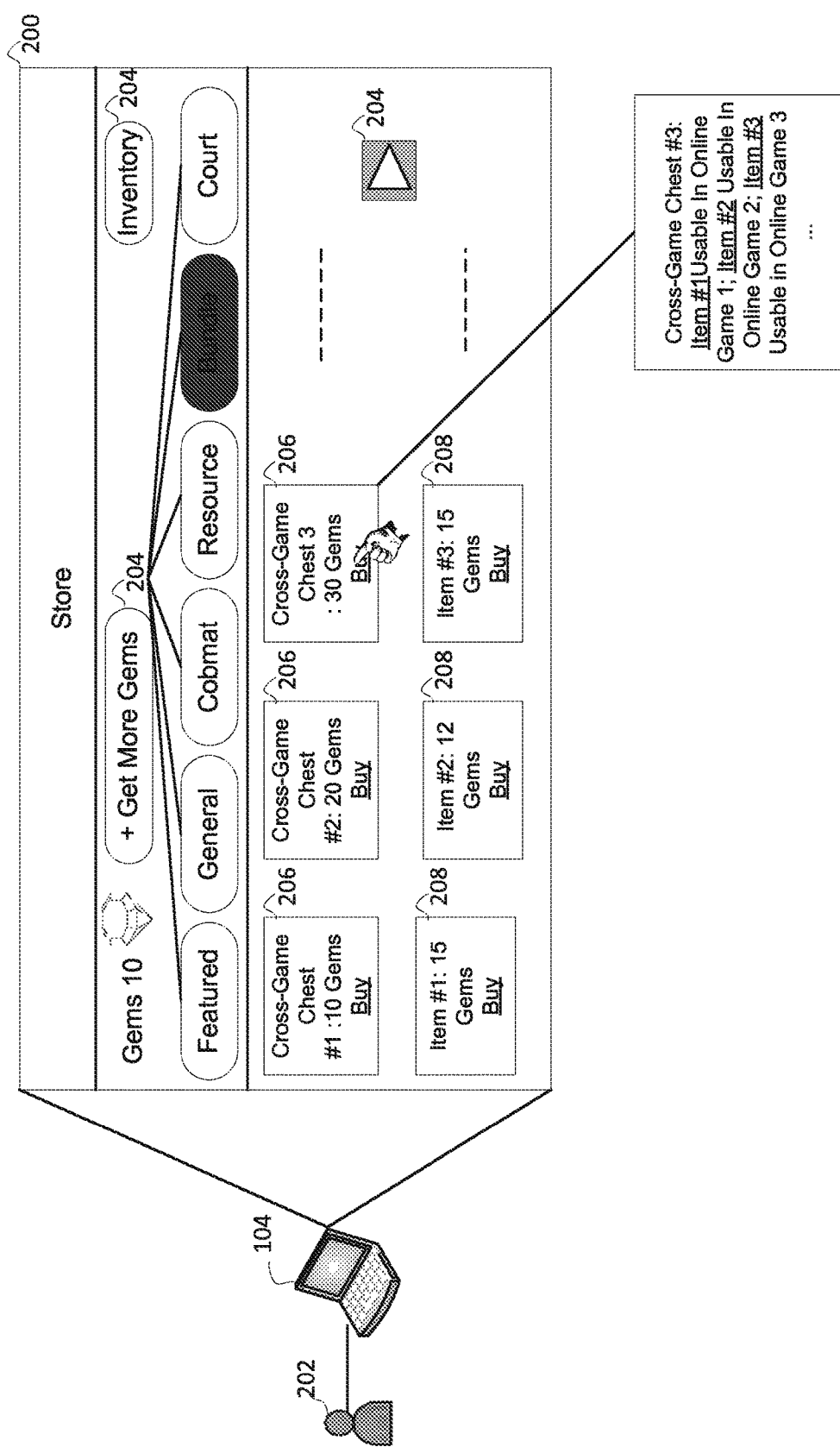
FIG. 2 illustrates an example of a store interface associated with a given online game hosted by the system shown in FIG. 1 as presented on a client computing platform.

FIG. 2 illustrates an example of a store interface associated with a given online game hosted by the system shown in FIG. 1 as presented on a client computing platform. As can be seen in FIG. 2, a user 202 may be enabled to access the store interface 200 through a client computing platform 104 associated with the user 202. As shown in this example, the store interface 200 may include field controls 204, such as buttons, tabs, input boxes and/or any other filed controls 204 to enable the user to interact with the store interface 200. As shown, the store interface 200 may include multiple sections of virtual items for sale to the users and each section may be organized by the functions the virtual items in that section serve, as suggested by the tabs 204. It should be noted that the store interface 200 may include an indication or indications of user balance of virtual currencies in his/her account. In this example, as shown, the user 202 has 10 gems (virtual currency) left in his account. As also shown, the user may purchase additional gems by clicking the "Get More Gems" button 204. As also shown in this example, the store interface 200 may include an "inventory" button 204 that will take the user to his/her inventory. It should be understood that the store interface 200 may be associated with the first online game, second online game, and/or any other online games hosted by system 100 shown in FIG. 1.

As illustrated in this example, a section of bundled package may be presented in the store interface 200 presenting instances of cross-game virtual containers 206. As shown in this example, individual instances of cross-game virtual containers 206 in the store interface 200 may be offered for purchase in exchange for virtual consideration from users. In this example, the virtual consideration for the instances of the cross-game virtual container is in the form of virtual concurrency such as gems, as shown. However, this is not intended to be limiting. It should be appreciated that the instances of cross-game virtual containers 206 may be offered for real world money credit, virtual credit (e.g., such as points), and/or any other form virtual consideration.

As shown in this example, the bundle section of the store interface 200 presents instances of cross-game virtual containers 206 for user to purchase. In this example, the offers presented in the store interface 200 include offers of instances cross-game virtual chests 206 and individual virtual items 208. As shown, instances of virtual containers 206 may be presented in exchange for virtual currencies from the user 302, e.g., gems. As illustrated in this example, the user 302 may click on the "buy" button on an instance of the cross-game virtual container at a given time. As will be described below, the purchased instance of the instance of cross-game virtual container 206 may be activated by user.

As can be seen from FIG. 2, a given instance of cross-game virtual container 206 may comprise virtual items usable in multiple online games. For example, without limitation, the cross-game virtual chest shown in this example comprises a first virtual item usable in the first online game, a second virtual item usable the second online game, and any other virtual items usable in other online games (if any). The virtual items included in an instance of the cross-game virtual container may include armor, weapon, speedup items, gears, magic items, decorative items, troops, and/or any other types of virtual items.

An armor item may provide a barrier for user characters during combats in a given game space. Common examples of an armor item may include, but not be limited to, leather armor, hide armor, chainmail (e.g., metal rings woven) armor, jackets, mantels, woven robes, padded vests, shields and any other types of armor.

A weapon item may provide attack prowess to the user character during combats within a given game space. Common examples of a weapon item may include melee weapon (e.g., sword, axe, knife, and any other types of melee weapons that can be used to attack enemies directly), ranged weapon (e.g., bow, spears, and any other types of ranged weapons that can be used to attack enemies some distance away), and other types of weapons.

A gear item may provide specific functionality to the user character within a given game space. Common examples of a gear item may include ammunition, backpack, pouch, belt, wand, chain, key, flask, lantern, rope, spell book, food, drink, tent, mounts, transport, and any other types of gear items.

A speedup item may speed up an amount of time left for user to complete a task in a given game space. For example, a construction speedup item may be used to speed up the amount of time left to complete a construction task by the user in the given game space. Common examples of speedup items may include construction, troop training, researching, leveling up, transportation, character advancing, farming, mining, harvesting, and/or any other types of speedup items for speeding up time-gated tasks in the given game space.

A magic item may provide magic power to user character in a given game space. Magic power may include super power that is not ordinarily possible. Examples of magic items may be in various forms. Some of them may include enchanted items, bloodlust items, invisibility items, attack power boost items, healing power items, necromancy items, hasting items, teleport items, fireball items, berserk items and any other types of magic items.

As should be clear, a given instance of the cross-game virtual container 206 may include virtual items usable in multiple online games. For example, an instance of a virtual chest may contain a first weapon item usable in the first online game, a second weapon item usable in the second online game, and other virtual items (if any). The instance of the cross-game virtual container may be provided for purchase in the store associated with the first online game, second online game, and/or any other online games.

In some examples, presenting offers of instance of cross-game virtual containers in the store interface by the store component 114 may include obtaining a price for an offer to sell an instance of a given virtual container. The prices obtained in those examples by the store component 114 may be such that they are perceived as bargains to users. For example, without limitation, an instance of cross-game virtual chest 206 offered for purchase in the interface 200 may contain a first virtual item usable in the first online game, a second virtual item usable in the second online game, and other virtual item(s) (if any). In that example, the price obtained by the store component 114 may be such that it is a fraction of a total of the prices for purchasing the first and second virtual items individually. For instance, the first virtual item may be offered for purchase in the interface 200 for X amount of virtual currency, and the second virtual item may be offered for purchase in the interface 200 for Y amount of virtual currency; and the instance of cross-game virtual container 206 comprising the first and second virtual items may be offered for purchase for X+Y−Z amount of virtual currencies, wherein Z>0. In another example, the second virtual item in the instance of cross-game virtual container 206 may be offered free or nearly free in the store associated with the first online game. That is, in that example, purchasing the first virtual item and the instance of cross-game virtual container 206 costs the user same amount of virtual currency. In this way, the user may be incentivized to purchase the instance of cross-game virtual container 206 and may incline to interact with the second online game some time later since the user has acquired the second virtual item through the purchased instance of cross-game virtual container 206.

In some examples, offers of the individual virtual items in the cross-game virtual container 206 may be presented in the store interface 200 next to a given instance of cross-game virtual container 206 so that a user may be informed of the bargain price at which a given instance of the cross-game virtual container is being offering. This is illustrated in FIG. 2. As can be seen from FIG. 2, items #1, #2, #3, which are included in the instance of cross-game virtual container 206 shown, may be offered for purchase in the same section where the instances of cross-game virtual containers 206 are presented to users. In this way, it may be clear to the user that the offer of an instance of cross-game virtual container 206 is a bargain. This may incentivize the user to purchase cross-game virtual containers 206.

Figure 3:
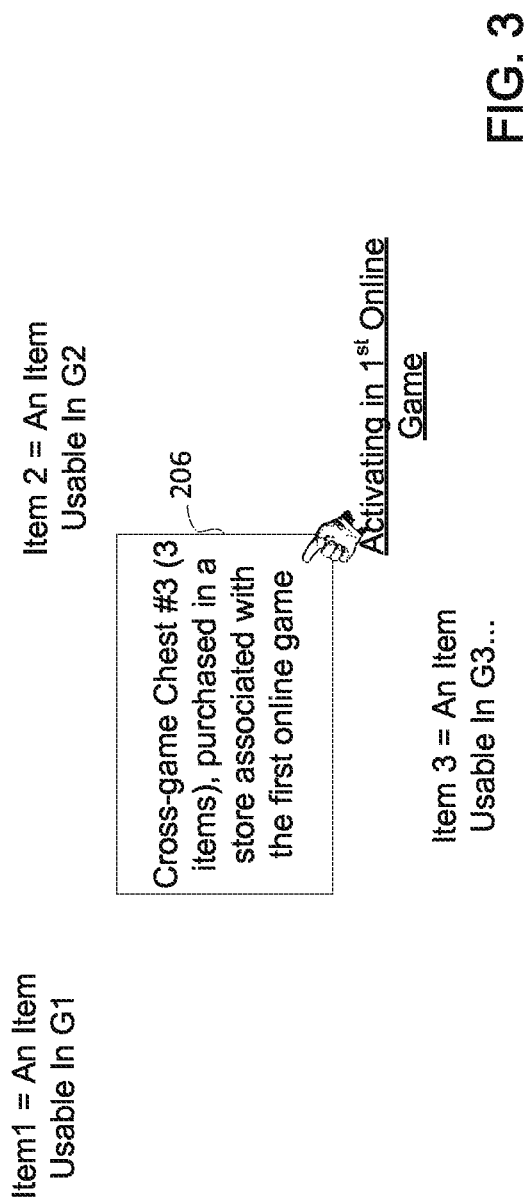
FIG. 3 illustrates an example of activating an instance of the cross-game virtual container purchased by a user.

The cross-game virtual container activation component 116 may be configured to activate instances of the cross-game virtual containers purchased by the users in the store associated with a given online game hosted by a server 102. To achieve this, the cross-game virtual container activation component 116 may receive an activation request from a user for activating a given instance of the cross-game virtual container purchased by the user in the given online game. For example, the user may be enabled to send an activation request (e.g., a mouse click or finger tap on the given instance of the cross-game virtual container) to activate the given instance of the cross-game virtual container purchased by the user. FIG. 3 illustrates an example of activating an instance of the cross-game virtual container purchased by a user.

Responsive to receiving an activation request from a user to activate an instance of the cross-game virtual container, the cross-game virtual container activation component 116 may be configured to make the virtual items included in the activated instance of cross-game virtual container available for access by the user in respective online games. This may involve mapping user names in different online games, locating user accounts in those online games, distributing the virtual items to user inventories associated with the located user accounts in those online games, and/or any other operations.

By way of non-limiting example, responsive to receiving an activation by the user, in a first online game, to activate an instance of the cross-game virtual container containing a first virtual item usable in a first online and a second virtual item usable in the second online game, the cross-game virtual container activation component 116 may distribute the first virtual item to the user inventory in the first online game, locate a user account associated with the user in the second online game, and distribute (e.g., record) the second virtual item to the user inventory in the second online game. However, this is merely illustrative. Other examples of making the second virtual item available to the user upon user activation of the purchased instance of the cross-game virtual container are contemplated. For example, a centralized virtual item inventory may be managed for a given user and individual virtual items in the centralized virtual item inventory may be associated with a corresponding game space in which the individual virtual items are available for access by the user.

In some examples, activation of a given instance of the cross-game virtual container by the cross-game virtual container activation component 116 may include obtaining a period of time during which one or more virtual items are available for access by users. For example, a virtual item in the activated instance of the cross-game virtual container may be available for access by the user for one hour, one day, one week, one month, or any other period of time after the instance of the cross-game virtual container is activated by the cross-game virtual container activation component 116. In some embodiments, such a period may be obtained from a user interface for the provider, administrator, moderator, and/or any other entities related to the server(s) 102 shown in FIG. 1. For instance, without limitation, an administrator of the server(s) 102 may set a period of time (e.g., one week) for a given virtual item (usable in a given game space) in an activated instance of the cross-game virtual container. In some other examples, obtaining such a period by the cross-game virtual container activation component 116 may include determining the period automatically based on one or more user metrics, game metrics, and/or any other types of metrics. For instance, the period of access may be set to span across a holiday or vacation period during which many users would have time to interact with online games hosted by system 100. In another example, the period of access may be determined based on usage of an online game. For instance, if an online game is not engaged by users frequently, a long period of access may be determined to enable users to use virtual items usable in that online extensively.

In some examples, activation of a given instance of the cross-game virtual container by the cross-game virtual container activation component 116 may include some random factor for distributing virtual items associated with the given instance of the cross-game virtual container to the users. In those examples, the given instance of the cross-game virtual container may be associated with a set of potential virtual items that may be distributed to users. The individual ones of the set of the potential virtual items may be associated with a probability of distribution; and actual virtual items distributed to a user upon the user's activation of the instance of the cross-game virtual container may be based on such probabilities. Examples of such cross-game virtual containers may include, but not be limited to, a mystery box, random box, surprise treasure trove, and/or any other types of cross-game virtual containers that may include a random factor to distribute virtual items.

The notification component 118 may be configured to generate notifications for notifying users that virtual items in activated instances of the cross-game virtual containers by the user in a given game space have been made available for access by the users in one or more online games corresponding to the virtual items. The notifications generated by the notification component 118 may include notifications internal and/or external to online games hosted by system 100. Internal notifications may include pop-up messages in a given online game, internal email messages through a mail system provided by the given online game, audible voice messages in the given online game announcing the notification, visual representations depicting the notification, and/or any other types of internal notifications presented to a user within a given online game. External notifications may include push notifications, external electronic messages facilitated by a third party, audible or visual notifications when users are not logged in the given game space, and any other types of external notifications.

The notifications generated by the notification component 118 may notify users that virtual items in the activated instance of the cross-game virtual container have been made available for the users to access in respective online games corresponding to those virtual items. By way of non-limiting example, after a given instance of the cross-game virtual container comprising a first virtual item usable in the first online game and a second virtual item usable in the second online game has been activated by a user in the first online game, the notification component 118 may generate a notification (e.g., a pop-up message) notifying the user that first virtual item has been made available for access (e.g., via the user inventory in the first online game), and the second virtual item has also been made available for access (e.g., via the user inventory in the second online game) by the user.

In some examples, the notifications generated by the notification component 118 may include information facilitating users to access the online games corresponding to virtual items in a given activated instance of the cross-game virtual container. For example, in some instances, the user may not have an account in the second online game although s/he activated a purchased instance of the cross-game virtual container containing a virtual item usable in the second online game. In that example, the notification component 118 may generate the notification to include information informing the user of means to acquire or activate an account in the second online game. For instance, without limitation, such information may include a location (e.g., a URL) where the user may register an account in the second online game.

In some examples, one or more virtual items in an activated instance of the cross-game virtual container may be made available for access within a period of time. In those examples, the notifications generated by the notification component 118 may include information indicating such a period of time. For example, without limitation, the second virtual item (usable in the second online game) in the activated instance of the cross-game virtual container may be made available for access by the cross-game virtual container activation component 116 within a determined period of time (e.g., for one week immediately after the activation of the purchased instance of cross-game virtual container). In that example, the notification component 118 may include information indicating such a period to the user. This may incentivize the user to interact with the second online game within the determined period of time.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

A given server 102 may include electronic storage 110, one or more processors 108, and/or other components. The given server 102 may include communication lines, or ports to enable the exchange of information with a network and/or other computing platforms. Illustration of the given server 102 in FIG. 1 is not intended to be limiting. The given server 102 may include a plurality of hardware, software, and/or firmware components operating together to provide the functionality attributed herein to server 102. For example, the given server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118. Processor 108 may be configured to execute components 112, 114, 116, 118 by software; hardware; firmware; some combination of software, hardware, and/or firmware; and/or other mechanisms for configuring processing capabilities on processor 108.

It should be appreciated that although components 112, 114, 116, 118 are illustrated in FIG. 1 as being co-located within a single processing unit, in implementations in which processor 108 includes multiple processing units, one or more of components 112, 114, 116, 118 may be located remotely from the other components. The description of the functionality provided by the different components 112, 114, 116, 118 described below is for illustrative purposes and is not intended to be limiting, as any of components 112, 114, 116, 118 may provide more or less functionality than is described. For example, one or more of components 112, 114, 116, 118 may be eliminated, and some or all of its functionality may be provided by other ones of components 112, 114, 116, 118. As another example, processor 108 may be configured to execute one or more additional components that may perform some or all of the functionality attributed below to one of components 112, 114, 116, 118.

Figure 4:
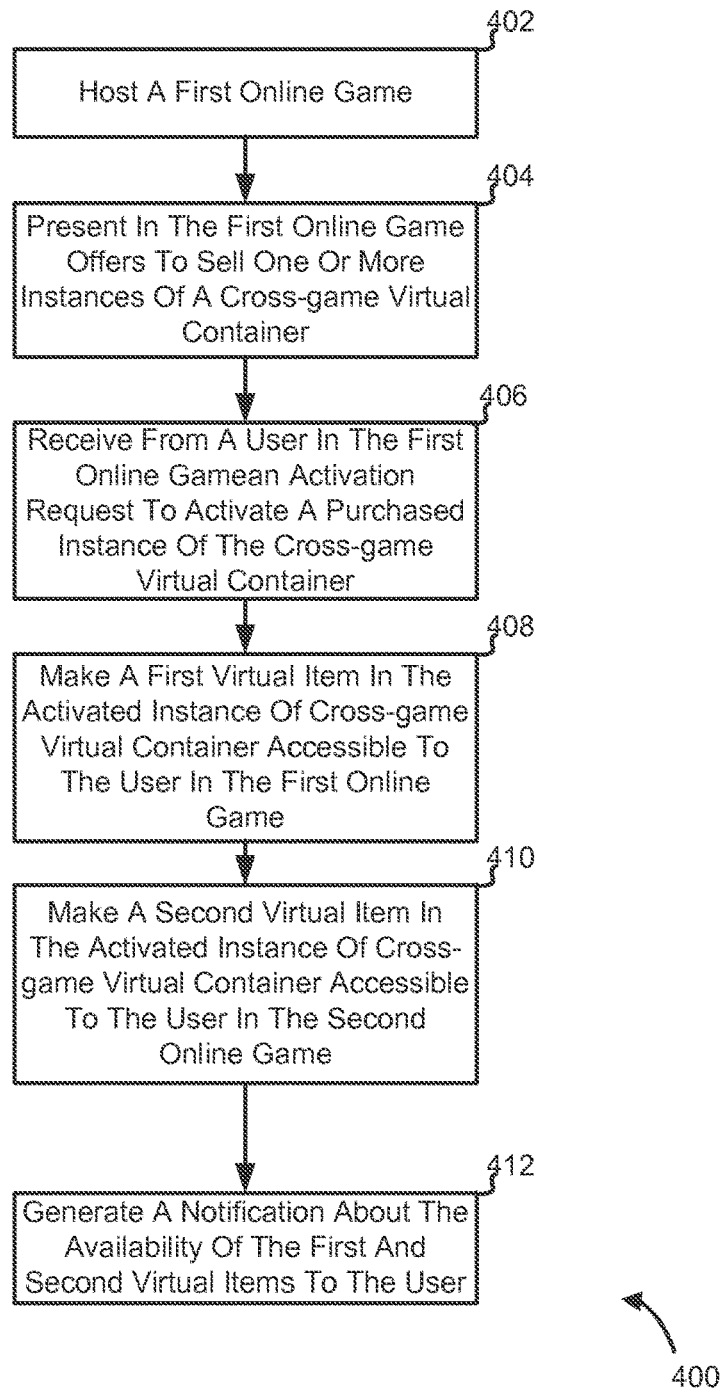
FIG. 4 illustrates one exemplary method for providing instances of cross-game virtual containers in an online game in accordance with the disclosure.

FIG. 4 illustrates one exemplary method 400 for providing instances of cross-game virtual containers in an online game in accordance with the disclosure. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, an instance of a first online game may be hosted. The users may interact with the game space by initiating game space commands to perform user actions. The instance of the first online game hosted in operation 402 may be associated with a first game space in which gameplays may be facilitated for users of the first online game. Within the first game space, users may control one or more of an element in the first game space. The users may input commands with specific parameters to undertake specific deeds, maneuvers, actions, functions, spheres of actions and/or any other types of interactions within the first game space. In some implementations, operation 402 may be performed by a game component the same as or similar to game component 112 (shown in FIG. 1 and described herein).

At an operation 404, offers to sell one or more instances of a cross-game virtual container may be presented in the first online game. The offers presented in operation 404 may be through a virtual store associated with the first online game. A given instance of the cross-game virtual container offered in the store interface may comprise virtual items usable in multiple online games. For example, without limitation, the given instance of the cross-game virtual container may include a first virtual item usable in the first online game, a second virtual item usable the second online game, and any other virtual items usable in other online games (if any). The virtual items included in an instance of the cross-game virtual container may include armor, weapons, speedup items, gear, magic items, decorative items, troops, and/or any other types of virtual items. In some implementations, operation 404 may be performed by a store component the same as or similar to store component 114 (shown in FIG. 1 and described herein).

At an operation 406, a request to activate a purchased instance of the cross-game virtual container may be received for a user in the first online game. This may involve mapping user names for the user in different online games, locating those user accounts for the user, and/or any other sub-operations. In some implementations, operation 406 may be performed by the cross-game virtual container activation component the same as or similar to cross-game virtual container activation component 116 (shown in FIG. 1 and described herein).

At operation 408, a first virtual item in the activated instance of the cross-game virtual container may be made available for access to the user in the first online game. This may involve distributing the first virtual item to a user inventory associated with the user in the first online game. In some implementations, operation 408 may be performed by the cross-game virtual container activation component the same as or similar to cross-game virtual container activation component 116 (shown in FIG. 1 and described herein).

At an operation 410, a second virtual item in the activated instance of the cross-game virtual container may be made available for access to the user in a second online game. This may involve distributing the second virtual item to a user inventory associated with the user in the second online game. The second online game may be separate and discrete from the first online game. In some implementations, operation 410 may be performed by the cross-game virtual container activation component the same as or similar to cross-game virtual container activation component 116 (shown in FIG. 1 and described herein).

At an operation 412, notification about the availability of the first and second virtual items in the first and second online games may be generated for presentation to the user. In some implementations, operation 412 may be performed by a notification component the same as or similar to notification component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A first game server for facilitating cross-game virtual containers in multiple online games including a first online game and a second online game, a system comprising:

one or more physical processors configured by machine-readable instructions to:

host, by the one or more physical processors of the first game server, the first online game, the first online game being associated with a first game space in which the first online game is played;

present, in the first online game, offers to sell instances of cross-game virtual containers in exchange for consideration from users of the first online game, individual ones of the instances of the cross-game virtual containers including virtual items usable in a second online game associated with a second game space in which the second online game is played, the second game space being separate and discrete from the first game space, wherein the second online game is hosted by a second game server that is separate and distinct from the first game server, the offers presented including a first offer of a first instance of a first cross-game virtual container including a second virtual item usable in the second online game; and receive activation requests from users for activating purchased instances of cross-game virtual containers purchased by the users in the first online game and responsive to such activation requests, make the virtual items in the purchased instances of the cross-game virtual containers available for access to the users such that responsive to a first activation request from a first user for activating the first instance of the first cross-game virtual container, the second virtual item is made available for access to the first user in the second online game hosted by the second game server, wherein the second virtual item is distributed to a virtual inventory associated with the first user in the second online game and is made available for use by the first user within the second online game for a time period after the first activation request, wherein the time period is determined based on usage characteristics of the second online game.

2. The system of claim 1, wherein the offers presented in the first online game further include a second offer to sell an instance of a first virtual item at a first price, and a third offer to sell an instance of the second virtual item at a second price.

3. The system of claim 2, wherein the first offer to sell the instance of the first cross-game virtual container is presented in the first online game at a third price that is a fraction of a total of the first price and the second price.

4. The system of claim 3, wherein the third price is equal to or nearly equal to the first or the second price.

5. The system of claim 1, wherein the one or more physical processors are further configured to, responsive to the first activation request, generate a notification for presentation to the first user in the first online game that the second virtual item has become available for access to the first user in the second online game.

6. The system of claim 1, wherein the one or more physical processors are further configured to, responsive to the first activation request, generate a notification for presentation to the first user in the first online game that the second virtual item is available for access to the first user in the second online game for the time period.

7. The system of claim 5, wherein the notification generated includes information facilitating the first user to access the second online game.

8. The system of claim 1, wherein the second virtual item included in the first instance of the first cross-game virtual container is a mystery item from a set of potential items associated with the first cross-game virtual container, individual ones of the set of potential items being usable in one or more online games other than the first online game, and wherein the one or more physical processors are further configured to, responsive to the first activation request, select the second virtual item from the set of the potential items associated with the first cross-game virtual container in accordance with a selection probability.

9. A method for facilitating cross-game virtual containers in multiple online games including a first online game and a second online game, the method being implemented in one or more physical processors configured to execute computer programs, the method comprising:

hosting, by a first game server, the first online game, the first online game being associated with a first game space in which the first online game is played;

presenting, in the first online game, offers to sell instances of cross-game virtual containers in exchange for consideration from users of the first online game, individual ones of the instances of the cross-game virtual containers including virtual items usable in a second online game associated with a second game space in which the second online game is played, the second game space being separate and discrete from the first game space, wherein the second online game is hosted by a second game server that is separate and distinct from the first game server, the offers presented including a first offer of a first instance of a first cross-game virtual container including a second virtual item usable in the second online game; and receiving activation requests from users for activating purchased instances of cross-game virtual containers purchased by the users in the first online game and responsive to such activation requests, make the virtual items in the purchased instances of the cross-game virtual containers available for access to the users such that responsive to a first activation request from a first user for activating the first instance of the first cross-game virtual container, the second virtual item is made available for access to the first user in the second online game hosted by the second game server, wherein the second virtual item is distributed to a virtual inventory associated with the first user in the second online game and is made available for use by the first user within the second online game for a time period after the first activation request, wherein the time period is determined based on usage characteristics of the second online game.

10. The method of claim 9, wherein the offers presented in the first online game further include a second offer to sell an instance of a first virtual item at a first price, and a third offer to sell an instance of the second virtual item at a second price.

11. The method of claim 10, wherein the first offer to sell the instance of the first cross-game virtual container is presented in the first online game at a third price that is a fraction of a total of the first price and the second price.

12. The method of claim 11, wherein the third price is equal to or nearly equal to the first or the second price.

13. The method of claim 9, further comprising, responsive to the first activation request, generating a notification for presentation to the first user in the first online game that the second virtual item has become available for access to the first user in the second online game.

14. The method of claim 9, further comprising, responsive to the first activation request, generating a notification for presentation to the first user in the first online game that the second virtual item is available for access to the first user in the second online game for the time period.

15. The method of claim 13, wherein the notification generated includes information facilitating the first user to access the second online game.

16. The method of claim 9, wherein the second virtual item included in the first instance of the first cross-game virtual container is a mystery item from a set of potential items associated with the cross-game virtual container, individual ones of the set of potential items being usable in one or more online games other than the first online game, and wherein the method further comprises responsive to the first activation request, selecting the second virtual item from the set of the potential items associated with the first cross-game virtual container in accordance with a selection probability.

* * * * *